UNITED STATES PATENT OFFICE.

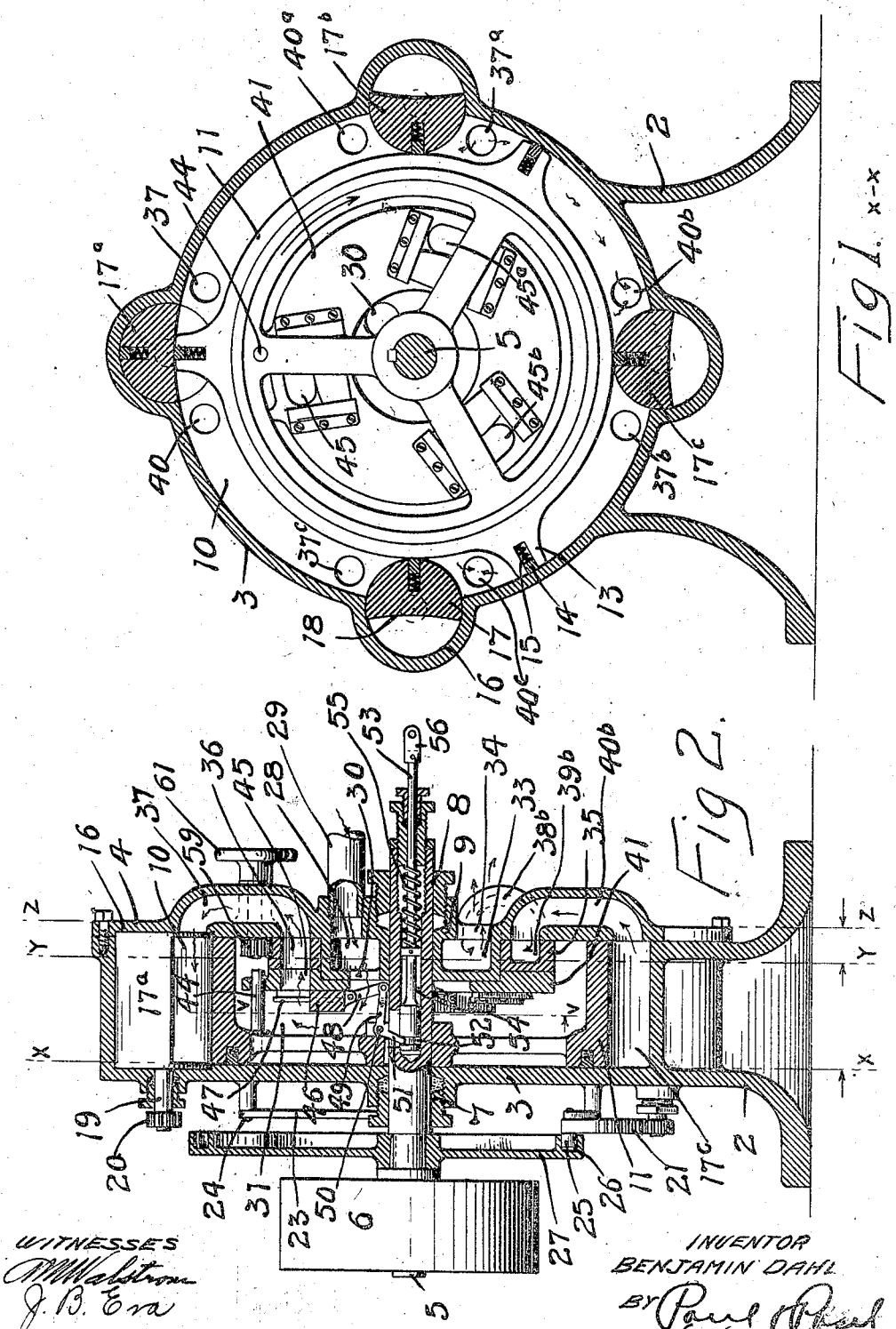

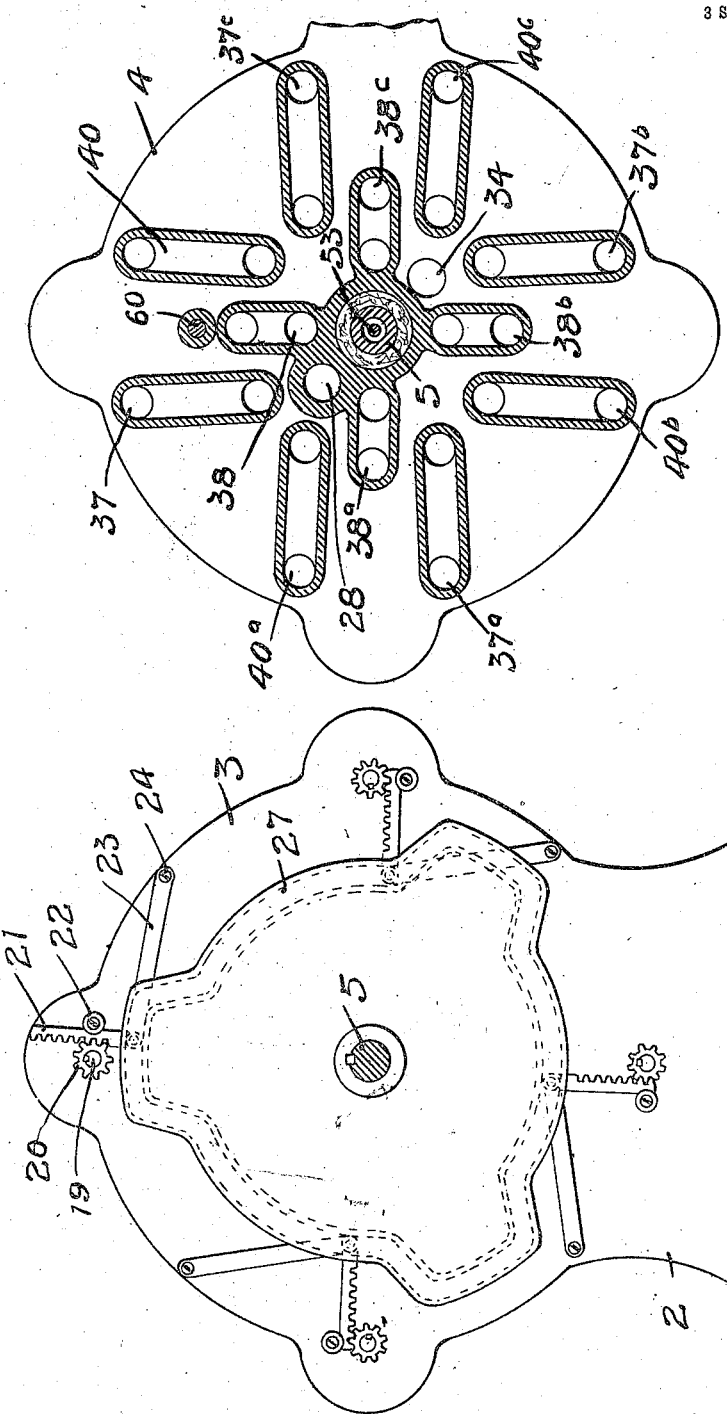

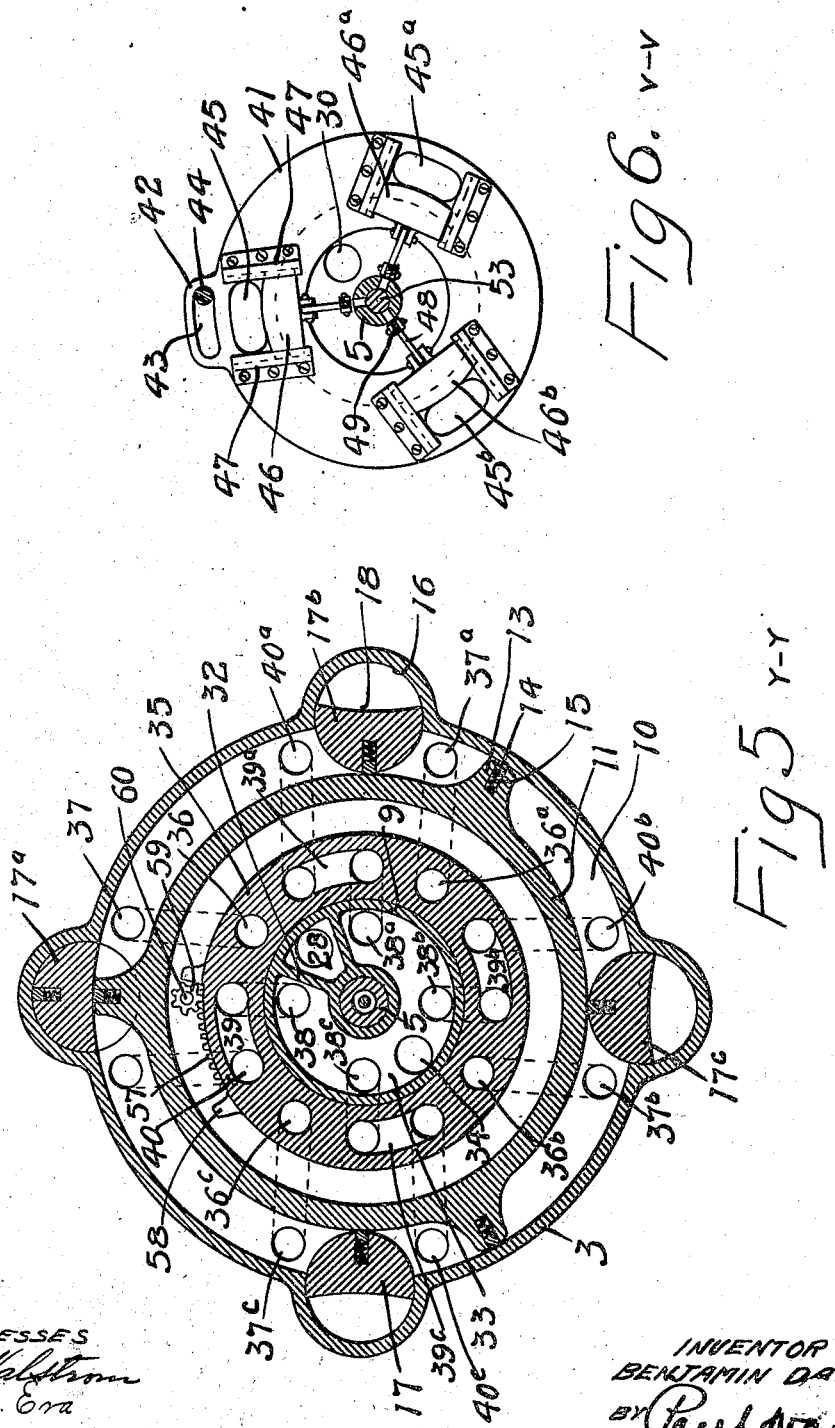

BENJAMIN DAHL, OF MINNEAPOLIS, MINNESOTA.

ROTARY ENGINE.

No. 894,485.  Specification of Letters Patent.  Patented July 28, 1908.

Application filed May 31, 1907. Serial No. 376,604.

*To all whom it may concern:*

Be it known that I, BENJAMIN DAHL, of Minneapolis, Hennepin county, Minnesota, have invented certain new and useful Improvements in Rotary Engines, of which the following is a specification.

The object of my invention is to provide an engine of the rotary type which will be uniform and regular in its movement, easily and quickly controlled and very efficient.

A further object is to provide a rotary engine which will be comparatively economical in the use of steam and can be adjusted to operate in either direction.

The invention consists generally in various constructions and combinations, all as hereinafter described and particularly pointed out in the claims.

In the accompanying drawings, forming part of this specification, Figure 1 is a vertical sectional view of a rotary engine embodying my invention, taken on the line $x$—$x$ of Fig. 2. Fig. 2 is a sectional view taken on a line substantially at right angles to the section line of Fig. 1. Fig. 3 is a sectional view illustrating the rear of the engine and the eccentric for operating the valves in the engine cylinder. Fig. 4 is a sectional view on the line $z$—$z$ of Fig. 2. Fig. 5 is a sectional view on the line $y$—$y$ of Fig. 2. Fig. 6 is a sectional view on the line $v$—$v$ of Fig. 2.

In the drawing, 2 represents a suitable base and 3 a circular casing having a removable plate or cover 4 on one side. 5 is the engine shaft having a pulley 6 and extending through the casing and having bearings 7 on one side therein and a bearing 8 in a hub 9 on the cover plate 4. The casing 3 with the said cover forms the cylinder of the engine, a chamber 10 being provided therein to receive the revolving piston 11 that is keyed on the shaft 5. This piston is in the form of a wheel and has a series of wings 13 on its periphery. There are preferably three of these wings arranged at uniform intervals, each one having a bearing block 14 that is yieldingly held against the inner surface of the cylinder by springs 15. A steam tight joint is thus formed between the ends of the wings and the wall of the cylinder. In the rear of each wing a chamber is formed into which the fluid pressure is admitted. The casing 3, or as I will hereinafter designate it, the cylinder, has a series of recesses 16 formed in its walls wherein valves 17 are adapted to rotate. These valves are semi-cylindrical in form and have packing blocks corresponding to those in the wings 13, and surfaces 18 on one side which during a certain interval in the rotation of the valves coincides with the periphery of the wing surface of the cylinder to form a continuous curved surface against which the bearing blocks of the wings 13 contact. The valves 17 are designed to form abutments at one end of the steam chamber when the pressure is admitted in the rear of the wings. For instance, referring to Fig. 1, on the right hand side of the figure, the valve is shown in position to cut off the passage around the piston, being moved to this position just as the wing passes the intake port and steam is admitted in the rear of the wing. The pressure of the steam so admitted will move the piston and the valve will remain closed until the wing is about midway between the intake and the exhaust when the intake will be cut off and the expansion of the steam utilized to force the pistons the remainder of the distance to the exhaust. The arrangement of these intake and exhaust ports will hereinafter be described in detail.

To operate the valves 17 at the proper time I provide each one with a stem 19 extending through the head of the cylinder and provided with a piston 20. A rack bar 21 is arranged to engage the teeth of the pinion, being held in contact therewith by an anti-friction wheel 22 and pivotally connected to a link 23 that is pivoted at 24 on the cylinder. An anti-friction wheel 25 is mounted on the rack bar 21 and adapted to enter a groove 26 provided on a cam 27 that is secured to the shaft 5. The revolution of this cam will obviously cause the reciprocation of the rack bars 21, the revolution of the pinions 20 and a corresponding movement of the valves 17. The time of the operation of the valves and the extent of their movement will depend, of course, upon the character of the groove in the cam 27. This groove will be made in such a way that the valves will swing across the steam chamber in the cylinder immediately after the passage of a wing and when the inlet port is opened in the rear of the wing to admit the pressure to the chamber. The chamber will then be closed in the rear of the inlet and will remain so until another wing approaches the valve when the valve will be rotated to open the chamber and allow the passage of the wing. By varying the shape of the groove in the cam the time of operation of the valves may of course be regulated.

For convenience of description I will designate the valves after the one marked 17, as $17^a$, $17^b$, and $17^c$. Within the hub 9 a passage 28 is formed communicating at one end with a fluid pressure supply pipe 29 and at its other through the port 30 with a fluid pressure chamber 31. The walls 32 (see Fig. 5) separate the passage 28 from an exhaust chamber 33 within the hub 9 and said chamber 33 has a discharge port 34. A ring 35 is mounted on the hub 9 and adapted to revolve thereon and has a series of ports 36, $36^a$, $36^b$, and $36^c$ arranged to coincide with the passages 37, $37^a$, $37^b$, and $37^c$ leading into the cylinder. Passages 38, $38^a$, $38^b$ and $38^c$ communicate with the exhaust chamber 33 and with one end of the ducts 39, $39^a$, $39^b$ and $39^c$ formed in the surface of the ring 35, and these ducts communicate with passages 40, $40^a$, $40^b$ and $40^c$ provided in the cover 4 and communicating with the cylinder on the opposite side of the rotary valves therein from the passages 37, $37^a$, $37^b$ and $37^c$. The arrangement of these passages and ducts will be understood by an examination of Figs. 4 and 5.

A cut off plate 41 is mounted on the inner end of the hub 9 and has a lug 42 on one side provided with a slot 43 through which a pin 44 secured to the piston 11 projects. The revolution of the piston will therefore revolve the cut off plate also. The plate is provided with elongated slots 45, $45^a$ and $45^b$ that are adapted to coincide, as the plate is revolved with the ports 36, $36^a$, $36^b$ and $36^c$ in the ring 35 and admit fluid pressure from the chamber 31 into the cylinder.

I have provided three slots in the cut out plate corresponding in number to the wings on the piston and the movement of the cut off plate will be timed so that one of these slots will coincide with the port in the ring 36 just as the wing on the piston has moved by the passage leading from the port in the ring to the cylinder. The slots in the cut off plate will be elongated sufficiently to allow the passage of steam therethrough until the piston wing has reached a point where the expansion of the steam will force it the remainder of the distance to the next port. For the purpose of regulating the flow of pressure through the slots in the cut off plate I provide a series of valves 46, $46^a$ and $46^b$, adapted to move between guides 47 on said cut off plate and connected by links 48 with bell crank levers 49 that are pivoted at 50 on the hub of the piston and have arms 51 projecting into an annular groove 52 in a stem 53 that is movable lengthwise in a socket 54 in the shaft 5. A spring 55 normally tends to hold the bell crank levers in the position shown in Fig. 2 with the valves 46, $46^a$ and $46^b$ retracted to expose the full width of the slots 45, $45^a$ and $45^b$. When, however, the revolution of the cut off plate 41 exceeds the desired degree of speed, the valves will be thrown outwardly by centrifugal force against the tension of the spring 45 to close the slots in the cut off plate and reduce the volume of fluid pressure admitted to the cylinder. An attachment 56 is preferably provided on the stem 53 to which a hand-operated lever (not shown) may be connected for the purpose of moving the stem lengthwise and opening or closing the slots in the cut off plate by hand.

As it is frequently desirable to reverse an engine of this type I provide gear teeth 57 on the periphery of the ring 35 between lugs 58 thereon and mount a pinion 59 on a shaft 60 which extends through the wall of the cylinder casing or cover 4 and is provided with a hand wheel 61.

By the operation of the hand wheel the ring 35 may be rotated and when it is turned toward the right from the position shown in Fig. 5 the intake and exhaust ports of the cylinder will be reversed. The port 36 will be moved over to communicate with the passage $40^a$ and the groove 39 will communicate with the passage 37 and the port 38 and become the exhaust while the passage 40 will communicate with port $36^c$ and become an intaking passage to admit the fluid pressure to the cylinder and on the opposite side of the piston wing from the position illustrated in Fig. 5.

I claim as my invention:

1. A rotary engine comprising a cylinder, a revolving piston therein having wings thereon at intervals arranged to contact with the walls of said cylinder, a series of valves arranged in the periphery of said cylinder and being substantially semi-cylindrical in form and adapted during a portion of their revolution to form a continuation of the surface of said cylinder, and during another part of their revolution to contact with said piston and form one end of pressure chambers between said valves and wings, and said cylinder having intake and exhaust passages communicating with the chambers between said valves and wings, and means for revolving said valves, and means comprising a rotating ring having ports arranged to register with said intake and exhaust passages for regulating the admission of fluid pressure to said chambers.

2. In a rotary engine, the combination, with a cylinder, of a revolving piston therein having a series of wings arranged to contact with the walls of said cylinder, revolving valves provided at intervals in the periphery of said cylinder and arranged during a portion of their stroke to contact with the surface of said piston, whereby fluid pressure chambers will be temporarily formed between said valves and wings and said cylinder having intake ports through which the fluid pressure is admitted to said chambers, means comprising a rotating ring whereby said port will be closed to cut off the fluid pressure when said wings are substantially midway between a valve and the next adjoining one, and said cylinder having suitable exhaust ports for said chambers, and means for revolving said valves.

3. In a rotary engine, the combination, with a cylinder, of valves mounted in the periphery thereof and substantially semi-cylindrical in form, said cylinder having recesses in which said valves revolve, a piston revolving between said valves and arranged to contact therewith during a portion of the revolution of said valves, said piston having wings at intervals to coöperate with said valves and form steam chambers, and said cylinder having inlet and exhaust ports communicating with said chambers, a rotating ring having ports arranged to register with the intake and exhaust ports of said cylinder, a revolving cam having a groove or track, and a rack bar having an anti-friction wheel to travel in said groove, and operatively connected with said valves to revolve them at predetermined intervals.

4. In a rotary engine, the combination, with a cylinder having intake and exhaust ports, of a revolving piston provided in said cylinder, a disk having a loose connection with said piston and adapted to revolve therewith, said disk having a series of elongated slots arranged to register with said intake ports during the revolution of said disk and piston, and a series of slide valves arranged to move across said slots and regulate the passage of the fluid pressure therethrough according to the speed of the piston, substantially as described.

5. In a rotary engine, the combination, with a cylinder having intake and exhaust ports, of a revolving piston provided within said cylinder and having a series of wings arranged to contact with the walls of said cylinder, said intake ports admitting the fluid pressure in the rear of said wings as the piston revolves, means operating between the wall of the cylinder, and the periphery of said piston for temporarily closing the space between them and confining the fluid pressure, a rotating ring having ports to coincide with the intake and exhaust ports of said cylinder, and means for shifting said ring to admit the pressure to either side of said wings and thereby drive said piston in either direction, substantially as described.

6. The combination, with a cylinder, having a series of semi-cylindrical valves in its periphery, and ports upon each side of said valve leading into said cylinder, a revolving piston having wings arranged to contact with the walls of said cylinder, there being fluid pressure chambers formed between said wings around the periphery of said piston and one of said ports on each side of said valves admitting fluid pressure in the rear of a wing as it passes said port and the next port head exhausting the fluid pressure, and the valve in the rear of said intake port temporarily closing the space between the wall of the cylinder and said piston, whereby a pressure chamber will be formed between the contiguous wing and said valve, and means for operating said valves, and a rotating member having ports to coincide with the inlet ports of said cylinder, substantially as described.

7. In a rotary engine, the combination, with a cylinder, of a revolving piston arranged therein and having rigidly mounted wings arranged to contact with the inner walls of said cylinder, there being three of said wings arranged at intervals on the periphery of said piston, a series of four valves provided within recesses in the periphery of said cylinder, said valves being semi-cylindrical in form and arranged to contact during a portion of their revolution with the surface of said piston, and said valves having surfaces which during a portion of their revolution form continuations of the surface of said cylinder and permits the unobstructed passage of said wings, and said cylinder having intake and exhaust ports on opposite sides of said valves, means for operating said valves, and means controlled by the movement of said piston for regulating the admission of fluid pressure to said cylinder.

8. In a rotary engine, the combination, with a cylinder, of a piston provided within said cylinder and having a series of wings, valves arranged to rotate between the wall of said cylinder and the periphery of said piston, and adapted to close the space between said wall and piston and coöperate with said wings to confine the fluid pressure, said wall having intake and exhaust ports on opposite sides of said valves, a rotating member having a central fluid pressure chamber and a fluid pressure supply passage leading thereto and slots and ports leading therefrom to said fluid pressure chamber and to said cylinder ports, and means for rotating said member whereby the fluid pressure may be admitted to said cylinder on either side of said wings and valves to drive said piston forward or backward.

In witness whereof, I have hereunto set my hand this 20th day of May 1907.

BENJAMIN DAHL.

Witnesses:
J. B. ERA,
I. M. PYATT.